US011223695B2

(12) United States Patent
Goodyear et al.

(10) Patent No.: US 11,223,695 B2
(45) Date of Patent: *Jan. 11, 2022

(54) CONTROLLING DATA TRANSMISSION

(71) Applicant: Egress Software Technologies IP Limited, London (GB)

(72) Inventors: John Goodyear, London (GB); Tony Pepper, London (GB); Neil Larkins, London (GB); Ian Angus Macinnes, London (GB)

(73) Assignee: Egress Software Technologies IP Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,345

(22) Filed: Dec. 9, 2020

(65) Prior Publication Data
US 2021/0092198 A1 Mar. 25, 2021

Related U.S. Application Data

(63) Continuation of application No. 16/395,607, filed on Apr. 26, 2019, now Pat. No. 10,911,556, and a (Continued)

(30) Foreign Application Priority Data
Oct. 28, 2016 (GB) ...................... 1618239

(51) Int. Cl.
*G06F 15/16* (2006.01)
*H04L 29/08* (2006.01)
(Continued)

(52) U.S. Cl.
CPC .......... *H04L 67/26* (2013.01); *G06Q 10/107* (2013.01); *H04L 51/28* (2013.01); *H04L 63/104* (2013.01);
(Continued)

(58) Field of Classification Search
CPC ....... H04L 67/26; H04L 51/28; H04L 63/104; H04L 67/1061; H04L 67/306; H04L 51/16; H04L 51/32; G06Q 10/107
(Continued)

(56) References Cited

U.S. PATENT DOCUMENTS 7,499,976 B2 3/2009 Cato
7,644,144 B1 1/2010 Horvitz et al.
(Continued)

OTHER PUBLICATIONS

United Kingdom Search Report dated Mar. 17, 2017 for Application No. GB 1618239.6.
(Continued)

*Primary Examiner* — Alan S Chou
(74) *Attorney, Agent, or Firm* — EIP US LLP

(57) ABSTRACT

A method of controlling transmission of data over a data network comprising authenticating a first user; sending a request message comprising data corresponding to a first group of user identifiers representative of proposed recipients, and determining updates to the group of user identifiers. The updates being based on a group score representing a similarity measure indicative of an overlap between the first group and a second group of user identifiers associated with an historical data package; and a user score for a second user identifier in the second group based on the group score and access data associated with the historical data package. A control message is transmitted to the client system, and an updated group of user identifiers is generated based on the control message. A data package is constructed and transmitted to a set of recipients based on the updated group of user identifiers.

15 Claims, 8 Drawing Sheets

Related U.S. Application Data continuation of application No. PCT/GB2017/053250, filed on Oct. 27, 2017.

(51) Int. Cl.
  *H04L 12/58* (2006.01)
  *G06Q 10/10* (2012.01)
  *H04L 29/06* (2006.01)

(52) U.S. Cl.
  CPC ........ *H04L 67/1061* (2013.01); *H04L 67/306* (2013.01); *H04L 51/16* (2013.01); *H04L 51/32* (2013.01)

(58) Field of Classification Search
  USPC ........................................................ 709/206
  See application file for complete search history.

(56) References Cited

U.S. PATENT DOCUMENTS

| | | |
|---|---|---|
| 7,996,456 B2 | 8/2011 | Gross |
| 8,037,143 B1 | 10/2011 | Atkins et al. |
| 8,271,598 B2 | 9/2012 | Guy et al. |
| 8,301,707 B1 | 10/2012 | Hebb et al. |
| 8,341,230 B2 | 12/2012 | Scott et al. |
| 8,688,793 B2 | 4/2014 | Hymel |
| 8,719,350 B2 | 5/2014 | Sharma |
| 8,892,672 B1 | 11/2014 | Rackliffe |
| 8,930,826 B2 | 1/2015 | Lu et al. |
| 8,984,074 B2 | 3/2015 | Monaco |
| 8,995,990 B2 | 3/2015 | Nurmi |
| 9,154,514 B1 * | 10/2015 | Prakash ................... H04L 51/12 |
| 9,311,415 B2 | 4/2016 | Roth et al. |
| 9,385,985 B2 | 7/2016 | Cooper et al. |
| 9,536,270 B2 | 1/2017 | Mallet et al. |
| 9,571,427 B2 | 2/2017 | Tomkins et al. |
| 9,716,685 B2 | 7/2017 | Chen et al. |
| 9,736,099 B2 | 8/2017 | Kaplinger et al. |
| 9,736,100 B2 | 8/2017 | Kaplinger et al. |
| 9,866,511 B2 | 1/2018 | Abou et al. |
| 10,044,664 B2 | 8/2018 | Dong et al. |
| 10,152,611 B2 | 12/2018 | Hurwitz et al. |
| 10,192,050 B2 | 1/2019 | Srivastav et al. |
| 10,264,081 B2 | 4/2019 | Guo et al. |
| 10,311,408 B2 | 6/2019 | Saito et al. |
| 10,346,411 B1 | 7/2019 | Deselaers et al. |
| 10,394,303 B2 * | 8/2019 | Vaccari ................ H04L 65/403 |
| 10,614,422 B2 | 4/2020 | Arora et al. |
| 10,911,556 B2 * | 2/2021 | Goodyear ............ G06Q 10/107 |
| 2002/0178228 A1 | 11/2002 | Goldberg |
| 2005/0278430 A1 | 12/2005 | Cato |
| 2007/0294428 A1 | 12/2007 | Guy |
| 2008/0071872 A1 | 3/2008 | Gross |
| 2008/0289037 A1 | 11/2008 | Marman et al. |
| 2009/0077026 A1 | 3/2009 | Yanagihara |
| 2009/0111447 A1 | 4/2009 | Nurmi |
| 2009/0210504 A1 | 8/2009 | Shuster |
| 2010/0250682 A1 | 9/2010 | Goldberg et al. |
| 2011/0010182 A1 * | 1/2011 | Turski ................... H04L 51/08 705/1.1 |
| 2011/0078587 A1 | 3/2011 | Guy et al. |
| 2012/0072519 A1 | 3/2012 | Oda |
| 2012/0192085 A1 | 7/2012 | Lu et al. |
| 2012/0246174 A1 | 9/2012 | Spears et al. |
| 2012/0260188 A1 | 10/2012 | Park et al. |
| 2013/0144682 A1 | 6/2013 | Dhara et al. |
| 2013/0304827 A1 | 11/2013 | Bastide et al. |
| 2014/0222815 A1 | 8/2014 | Roth et al. |
| 2014/0229556 A1 | 8/2014 | Cooper et al. |
| 2015/0188851 A1 | 7/2015 | Tomkins et al. |
| 2015/0215252 A1 | 7/2015 | Rackliffe |
| 2015/0302079 A1 | 10/2015 | Mallet et al. |
| 2017/0068906 A1 | 3/2017 | Korycki et al. |
| 2017/0201575 A1 | 7/2017 | Song et al. |
| 2017/0244746 A1 | 8/2017 | Hawthorn et al. |
| 2017/0374008 A1 | 12/2017 | Akselrod et al. |
| 2018/0052850 A1 | 2/2018 | Chatterjee et al. |
| 2018/0091476 A1 | 3/2018 | Jakobsson et al. |
| 2018/0212903 A1 | 7/2018 | Rose et al. |
| 2019/0019155 A1 | 1/2019 | Arora et al. |
| 2019/0132270 A1 | 5/2019 | Jawaharlal et al. |
| 2019/0138653 A1 | 5/2019 | Roller et al. |
| 2020/0036667 A1 | 1/2020 | Talton et al. |
| 2021/0273895 A1 * | 9/2021 | Gupta ................... H04L 51/063 |

OTHER PUBLICATIONS

International Search Report and Written Opinion dated Feb. 13, 2018 for PCT Application No. PCT/GB2017/053250.

* cited by examiner

CONTROLLING DATA TRANSMISSION

CROSS-REFERENCE TO RELATED APPLICATIONS

This application is a continuation under 35 U.S.C § 120 of U.S. patent application Ser. No. 16/395,607, filed Apr. 26, 2019, which is a continuation of International Application No. PCT/GB2017/053250, filed Oct. 27, 2017, which claims priority to UK Application No. GB1618239.6, filed Oct. 28, 2016, under 35 U.S.C. § 119(a). Each of the above-referenced patent applications is incorporated by reference in its entirety.

BACKGROUND OF THE INVENTION

Field of the Invention

The present disclosure relates to controlling transmission of data over a data network, based on a group of one or more user identifiers.

Description of the Related Technology

When composing an email message, a user may designate or "add" one or more email addresses as proposed recipients of the email message. Typically, designation of the one or more email addresses is performed manually by the user and is therefore susceptible to human error. For example, the user may designate the email address of an unintended recipient of the email message, or omit an intended recipient of the email message.

Designation of an unintended recipient can lead a loss of sensitive or confidential data, and therefore represents a threat to the owner of such data (e.g. the user or an enterprise associated with the user). Similarly, omitting an intended recipient of the email message can lead to undesirable consequences, such as causing inconvenience for the user and/or the intended recipients.

SUMMARY

According to a first aspect of the present invention, there is provided a method of controlling transmission of data, the method comprising: receiving first data associated with a first data package to be sent over a data network, the first data being indicative of a first user identifier corresponding to a sender of the first data package and a first group of user identifiers corresponding to one or more proposed recipients of the first data package; identifying a second group of user identifiers comprising the first user identifier, the second group of user identifiers being associated with a second data package previously transmitted over the data network; determining a group score for the second group of user identifiers based on a similarity measure, wherein the similarity measure is indicative of a degree of overlap between the first group of user identifiers and the second group of user identifiers; determining a user score for a second user identifier in the second group of user identifiers based on the group score and access data indicative of a time at which the second user accessed a payload associated with the second data package; and generating, based on the user score, second data indicating a change to the first group of user identifiers; wherein: either the determining a group score or the determining a user score is further based on transmission data indicating a time at which the second package was transmitted; and the second data is generated to indicate that the second user identifier should be removed from the first group of user identifiers when the user score satisfies a second condition and the first group of user identifiers indicated by the first data includes the second user identifier.

According to some embodiments, the second data is generated to indicate that the second user identifier should be added to the first group of user identifiers when the user score satisfies a first condition and the first group of user identifiers indicated by the first data does not include the second user identifier.

According to some embodiments, the second group of user identifiers is associated with a third data package previously transmitted over the data network, the method further comprising: updating the group score for the second group of user identifiers based on the similarity measure and transmission data indicating a time at which the third data package was transmitted.

According to some embodiments, the method further comprises: updating the user score for the second user identifier in the second group of user identifiers based on access data indicating a time at which the second user accessed the third data package.

According to some embodiments, the second group of user identifiers is identified from a data structure storing historical package data associated with a plurality of data packages previously transmitted over the data network.

According to some embodiments, the data structure comprises a graph data structure which defines a relationship between the second group of user identifiers, the second package, the transmission data and the access data.

According to some embodiments, the similarity measure is calculated according to:

$$J = \left|\frac{r \cap u}{r \cup u}\right|$$

wherein r is the first group user identifiers and u is the second group of user identifiers.

According to some embodiments, the group score for the second group of user identifiers is updated based on a transmission decay function which is a function of the time that has elapsed since the time at which the second data package was transmitted.

According to some embodiments, the transmission decay function is calculated according to:

$$1 + \tanh\left(\frac{-\Delta D^t + \alpha_1}{\beta_1}\right)$$

wherein $\Delta D^t$ is the number of days since the time at which the second data package was transmitted and $\alpha_1$ and $\beta_1$ are tuneable parameters.

According to some embodiments, the user score for the second user identifier in the second group of user identifiers is updated based on an access decay function which is a function of the time that has elapsed since the time at which the second user accessed the payload associated with the second data package.

According to some embodiments, the access decay function is calculated according to:

$$\Theta\left[1 + \tanh\left(\frac{-\Delta D^a + \alpha_2}{\beta_2}\right)\right]$$

wherein $\Delta D^a$ is the number of days since the time at which the second user accessed the payload associated with the second data package and $\Theta$, $\alpha_2$ and $\beta_2$ are tuneable parameters.

According to some embodiments, the second data package is an email message and the payload associated with the second data package is content contained in a body of the email message.

According to some embodiments, the payload associated with the second data package is an encrypted payload and the time indicated by the time at which the second user accessed the payload associated with the second data package corresponds to the time of receipt of a request from the second user to access the encrypted payload.

According to a second aspect of the present invention, there is provided a non-transitory computer-readable storage medium comprising computer-executable instructions which, when executed by a processor, cause a computing device to perform a method of controlling transmission of data according to the first aspect.

According to a third aspect of the present invention, there is provided a system for controlling transmission of data, the system comprising: one or more processors; and a memory configured to store computer-executable instructions which, when executed by the one or more processors, cause the system to perform a method of controlling transmission of data, according to the above described first aspect.

According to a fourth aspect of the present invention, there is provided a method of controlling transmission of data, the method comprising: receiving first data associated with a first data package to be sent over a data network, the first data being indicative of a first user identifier corresponding to a sender of the first data package and a first group of user identifiers corresponding to one or more proposed recipients of the first data package; identifying a second group of user identifiers comprising the first user identifier, the second group of user identifiers being associated with a second data package previously transmitted over the data network; determining a group score for the second group of user identifiers based on a similarity measure, wherein the similarity measure is indicative of a degree of overlap between the first group of user identifiers and the second group of user identifiers; determining a user score for a second user identifier in the second group of user identifiers based on the group score and access data indicative of a time at which the second user accessed a payload associated with the second data package; and generating, based on the user score, second data indicating a change to the first group of user identifiers; wherein: either the determining a group score or the determining a user score is further based on transmission data indicating a time at which the second package was transmitted; and the second data is generated to indicate that the second user identifier should be added to the first group of user identifiers when the user score satisfies a first condition and the first group of user identifiers indicated by the first data does not include the second user identifier.

Further features and advantages of the disclosure will become apparent from the following description of preferred embodiments of the invention, given by way of example only, which is made with reference to the accompanying drawings.

DETAILED DESCRIPTION OF CERTAIN INVENTIVE EMBODIMENTS

Embodiments of the disclosure provide methods and systems for determining one or more updates or changes to a group of proposed recipients of a data package to be transmitted over a data network. According to these techniques, the one or more changes to the group of proposed recipients are determined on the basis of historical data relating to one or more data packages previously transmitted over the data network. More specifically, the disclosed methods and systems utilise the historical data to identify one or more groups of users which were designated as senders or recipients of data packages previously transmitted over the data network, and use the identified one or more groups to determine one or more changes to the group of proposed recipients. In this manner, the historical package data is used to identify one or more recipients to be added to the group of proposed recipients, and/or one or more recipients to be removed from the group of proposed recipients.

Figure 1:
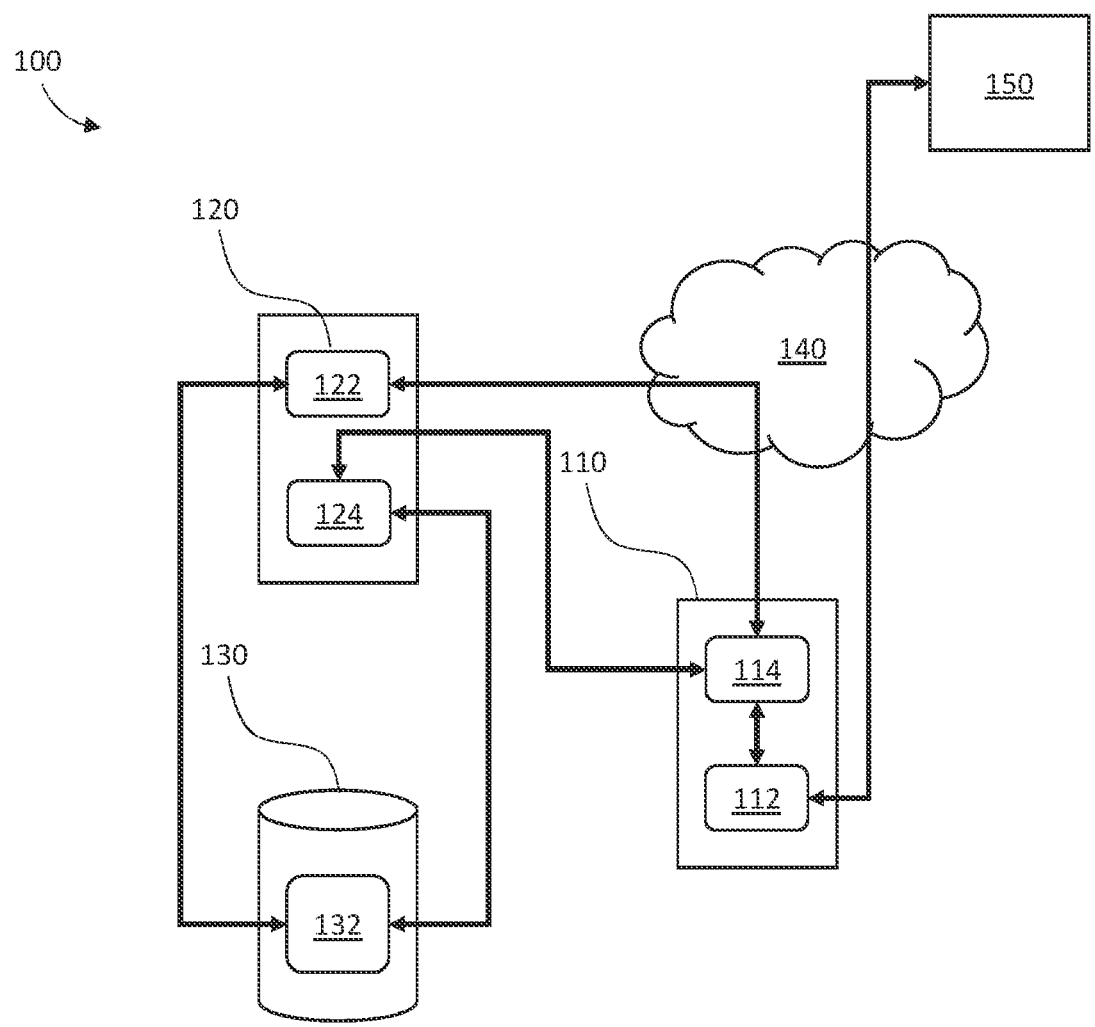
FIG. 1 is a schematic diagram showing a system for controlling transmission of data in accordance with an embodiment.

FIG. 1 is a schematic diagram showing a system 100 according to an embodiment. The system 100 includes a client system 110, a server system 120, a data storage system 130 and a data network 140. The data network 140 may, for example, be or include the Internet, a Public Land Mobile Network (PLMN) and/or a Public Switched Telephone Network (PSTN). The client system 110 and the server system 120 are communicatively coupled to each other via the data network 140.

The client system 110 is configured with a package generation component 112 and a transmission control component 114. The package generation component 112 is configured to provide an interface for composition of a data package to be generated and transmitted over the data network 140 to one or more recipients 150. In this respect, the data package generated by the package generation component 122 comprises a payload and a plurality of user identifiers corresponding to a sender (hereinafter termed the "sender identifier") and a group of proposed recipients for the data package (hereinafter termed the "recipient identifiers").

The transmission control component 114 is configured to receive or obtain the plurality of user identifiers associated with the data package generated by the package generation component 112, and to cooperate with the server system 120 to determine one or more updates prior to transmission of the data package over the data network 140. In some embodiments, the one or more updates are presented to the sender as one or more optional changes to the group of recipient identifiers for the data package (i.e. suggested changes). In other embodiments the one or more updates may be enforced by the transmission control component 114 as changes to the group of recipient identifiers without input from the sender (i.e. mandatory changes).

According to some embodiments, the package generation component 112 may be provided by an email application or an email component of a personal information manager (PIM) configured on the client system, such as Microsoft Outlook™ developed by Microsoft™ Corporation of Redmond, Wash., United States of America. In such embodiments, the transmission control component 114 may be provided as functionality integral to the email application or email component, or may be provided as a third-party "plug-in" which is installed separately from the email application or email component itself.

In further embodiments, the package generation component 112 and the transmission control component may be part of a Web-based email application, which is accessed via a Web browser configured on the client system 110. In such embodiments, the Web-based email application may be hosted on a remote server (not shown) and accessed over the data network, or hosted locally at the server system 120 shown in FIG. 1.

The server system 120 is configured with an update service 122 and a registration service 124. The update service 122 is configured to cooperate with the transmission control component 114 to determine the one or more updates to the group of sender identifiers. In particular, the update service 122 is configured to access the data storage system 130 to retrieve historical package data 132 associated with the sender identifier, and to use the retrieved historical package data 132 to determine the one or more updates to the group of recipient identifiers. Communications between the transmission control component 114 and the update service 122 may be facilitated using a messaging protocol, such as the Simple Object Access Protocol (SOAP) messaging protocol.

The historical package data 132 comprises a data structure which defines the relationship between the plurality of data packages previously transmitted over the data network and a plurality of users associated with those data packages. In particular, the data structure comprises user data defining one or more groups of users (also termed "cliques"), wherein each user in a particular group is associated, by virtue of a sender and/or recipient relationship, to a particular data package. Thus, each data package in the data structure is associated with a single group of users, whereas a particular group of users may be associated with one or more data packages (e.g. multiple data packages exchanged among the same group of users). The data structure also stores transmission data indicative of a time at which each data package was transmitted over the data network 140, and access data indicative of a time or times at which the payload for each data package was accessed by one or more of the users in the associated group of users.

In some embodiments, the data structure takes the form of a database (not shown), such as a relational database or a graph database. In the case of a graph database, the data structure may utilise a graph structure to store the historical package data in the form of nodes, edges and properties, as discussed below with reference to FIGS. 4 to 7.

The server system 120 further comprises a data management service 124 which is configured to manage the historical package data 132 stored in the data storage system 130. In particular, the data management service 124 is configured to receive messages indicating one or more changes to the historical package data 132. In some examples, the data management service 124 may receive a registration message indicating that a new data package has been transmitted over the data network 140 from a particular sender to a particular group of recipients. In this case, the data management service 124 updates the data structure to register the new data package, the transmission time, the associated sender and the associated group of recipients. In further examples, the data management service 124 may receive an access message indicating a time that an already registered recipient in the data structure has accessed or requested access to a payload associated with an already registered data package in the data structure. In some examples, the access message may relate to a request to access an encrypted payload of the already registered data package, wherein access to the encrypted data requires a cryptographic key stored or managed by the server system 120. In this case, the data management service 124 updates the data structure to register the access time for the payload associated with the already registered data package.

Figure 2:
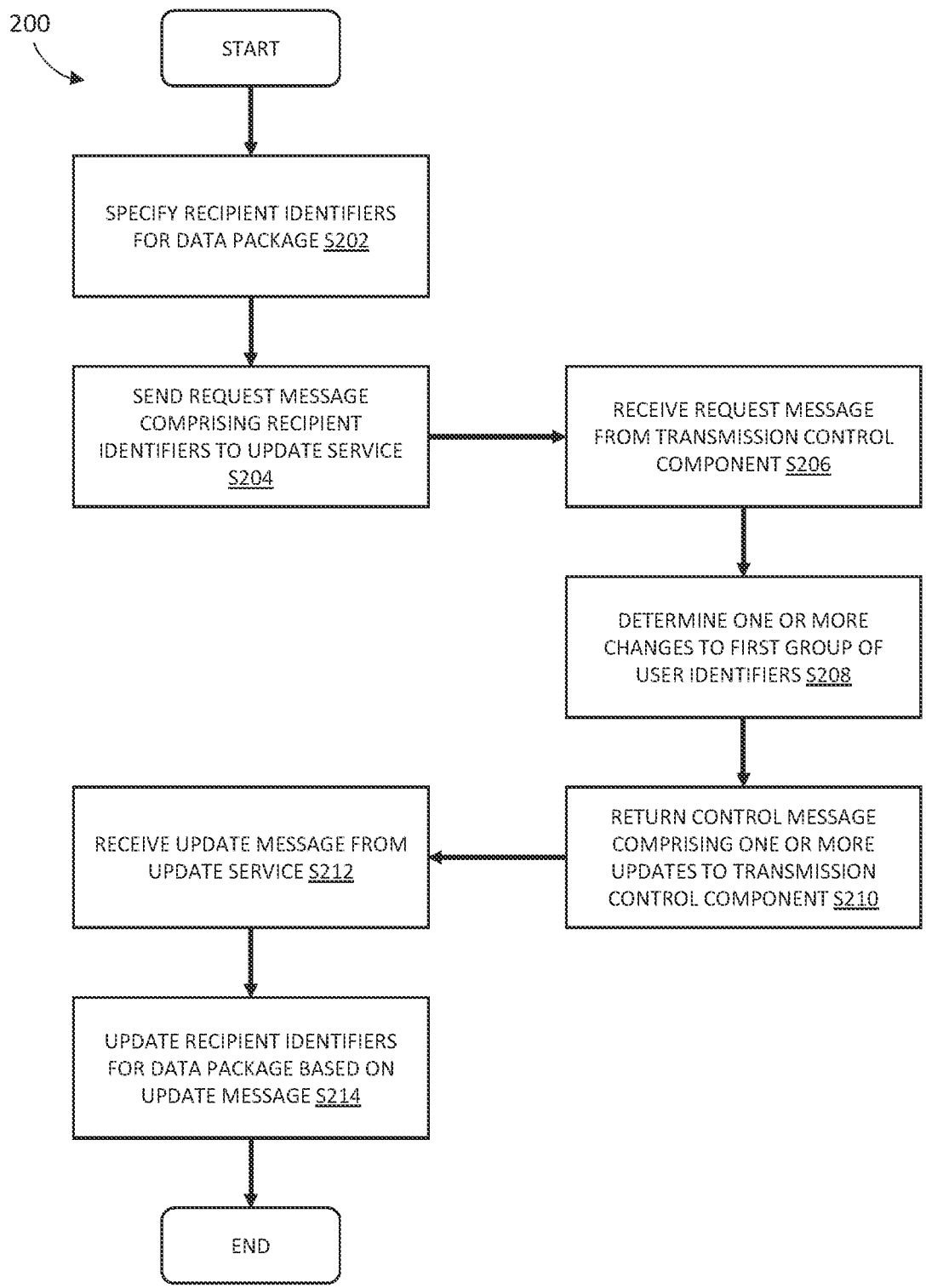
FIG. 2 is a flow diagram showing a method of controlling transmission of data in accordance with an embodiment.

FIG. 2 is a flow chart showing a method 200 performed by the system 100 of FIG. 1 to control transmission of a data package in accordance with an embodiment. In a first step, a user specifies a group of user identifiers comprising a sender identifier and a group of recipient identifiers for the data package using the package generation component 112 (step S202). In response to specification of the recipient identifiers, the transmission control component 114 generates a first message (hereinafter termed a "request message") comprising the sender identifier and the group of recipient identifiers for the data package, and sends the request message to the update service 122 running on the server system 120 (step S204). The update service 122 receives the request message from the transmission control component 112 (step S206) and accesses the historical package data 132 to determine one or more updates to the group of recipient identifiers specified in the request message (step S208). For example, the update service 122 may identify one or more user identifiers to be added to the group of recipient identifiers and/or one or more user identifiers to be removed from the group of recipient identifiers. Once the one or more updates have been determined, the update service generates a second message (hereinafter termed a "control message") and returns the control message to the transmission control component 114 (step S210). Upon receipt of the control message (step S212), the transmission control component 112 controls transmission of the data package based on the one or more updates specified in the control message (step S214).

In some embodiments, it may not be necessary to include the sender identifier in the request message sent to the update service 122. For example, the sender identifier may be provided to the update service 122 as part of an authentication process between the client system 110 and the server system 120, which is performed before the request message is sent to the update service 122. In such examples, the update service 122 may associate the request message with the previously obtained sender identifier and proceed to determine the one or more updates on that basis.

As discussed above, the transmission control component 114 may be configured to control transmission of the data package by presenting the one or more updates to the user as "suggested" or "optional" updates for selection, prior to making any changes to the group of recipient identifiers. In alternative embodiments, the transmission control component 114 may be configured to enforce the one or more updates as "mandatory" updates without input from the user. For example, the transmission control component 114 may be configured to enforce the one or more updates as mandatory updates based on an administrator or enterprise defined policy.

According to some embodiments, the method 200 of FIG. 2 may be performed before a data package 300 is actually generated by the package generation component 112. That is, the transmission control component 114 may be configured to extract or obtain the group of recipient identifiers from the package generation component 112 while the user is in the process of composing the proposed data package 300. The data package 300 itself may not be generated until the one or more updates have been made to the group of recipients by the transmission control unit, and the user has instructed the package generation component 112 to transmit the data package 300 to the group of recipients.

Figure 3:
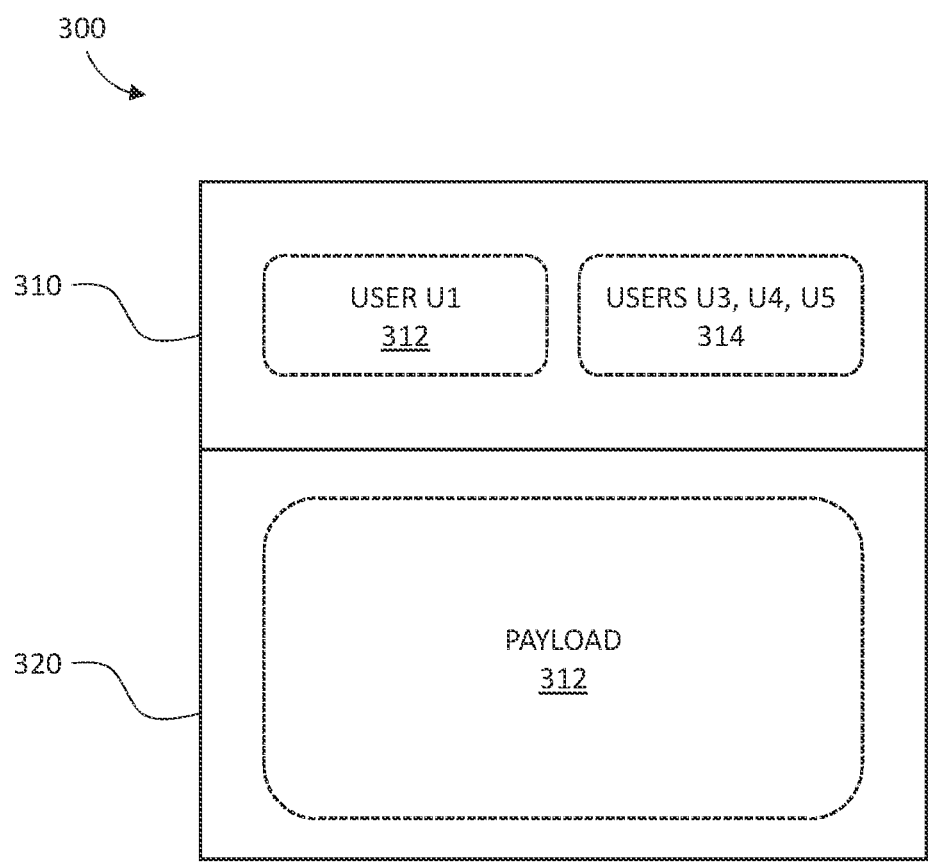
FIG. 3 is a schematic diagram showing an example of a data package for use in an embodiment.

An example of a data package 300 generated or composed using the package generation component 112 is shown schematically in FIG. 3. In this example, the data package 300 includes metadata 310 and payload data 320. The metadata includes sender data 312 indicating the sender identifier for the data package 300, and recipient data 314 indicating the group of recipient identifiers for the data package 300. In this particular example, the sender data 312 comprises a sender identifier corresponding to user U1 and the recipient data 314 comprises a group of recipient identifiers corresponding to users U3, U4 and U5. The payload data 320 includes content associated with the data, such as text data, image data, audio-visual data, documents, attachments, or any combination thereof. Further, the payload data may be encrypted using an encryption algorithm, such as a symmetric encryption algorithm in accordance with the Advanced Encryption Standard (AES) established by the United States National Institute of Standards and Technology (NIST). In contrast, the metadata 310 is typically stored in plaintext (i.e. not encrypted) such that the data package 300 can be correctly routed and delivered over the data network 140.

According to some examples, the data package 300 of FIG. 3 may be a digital message, such as an email message according to the Simple Mail Transfer Protocol (SMTP) and/or the Multipurpose Internet Mail Extensions (MIME) standards. In this latter case, sender data 312 and recipient data 314 correspond to the "From" and "To" fields in the email header and the sender identifier and the group of recipient identifiers are email addresses according to the SMTP standard. In further examples, the sender data 312 and the recipient data 314 may optionally include one more email addresses included in the "cc" field of the email header. Similarly, the payload data 320 corresponds to one or more content types or attachments stored in the body of the email message. In further examples, the data package 300 may be an instant message, a chat message, a social network communication, a calendar invitation, a document sharing invitation, or any other medium for distributing a payload from a sender to a group of recipients over the data network 140.

Figure 4:
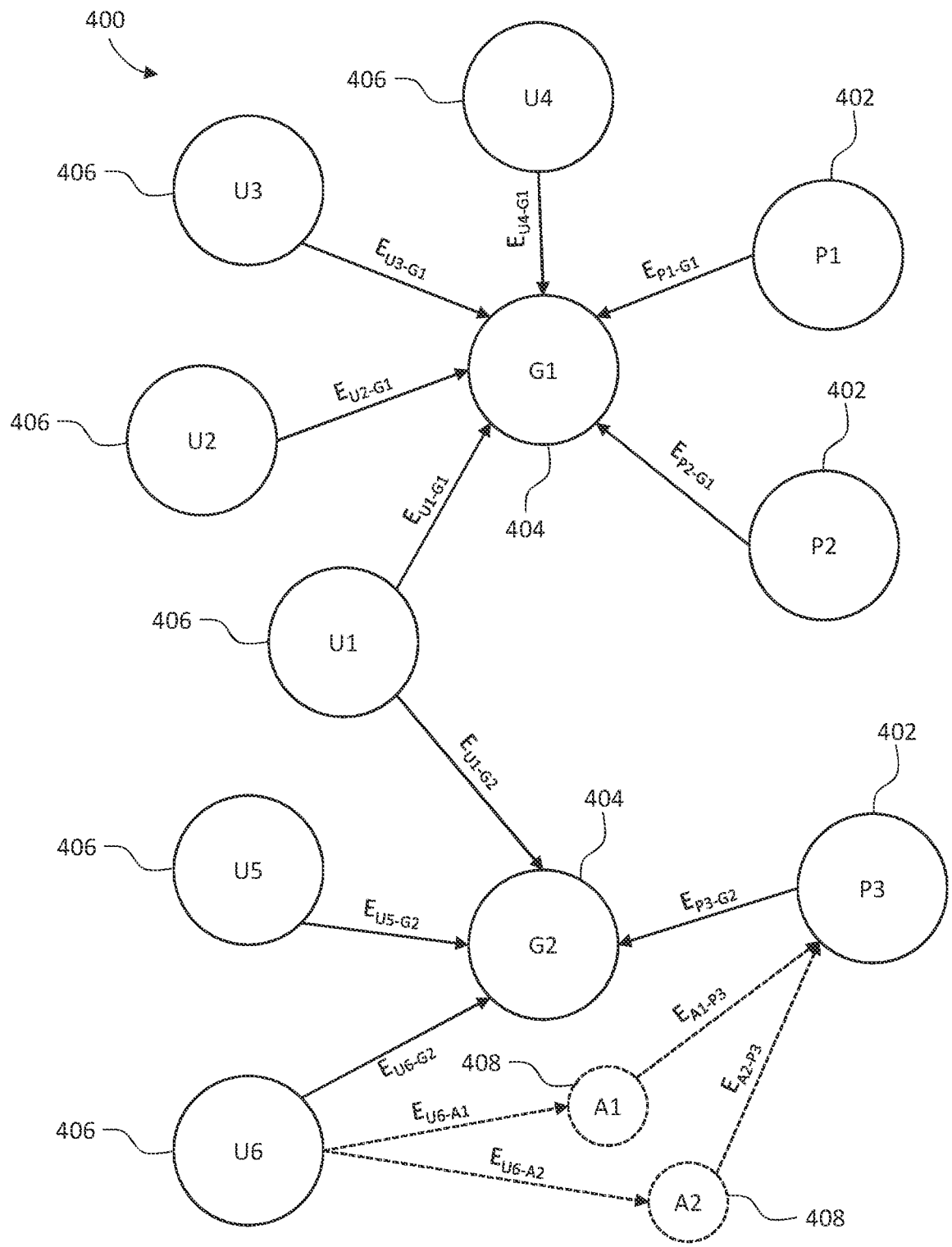
FIG. 4 is a schematic diagram showing an example of a data structure for use in an embodiment.

An example of a data structure 400 comprising the historical package data 132 stored by the data storage system 130 is shown schematically in FIG. 4. Specifically, FIG. 4 shows a particular section or part of the example data structure 400 which is associated with or centred on the sender identifier U1 specified in the data package 300 described above with reference to FIG. 3. In this example, the data structure 400 is a graph data structure comprising plurality of nodes, a plurality of edges and a plurality of properties which together represent a plurality of data packages previously transmitted over the data network 140. It will be appreciated that, as a whole, the example data structure 400 may comprise many thousands or millions of nodes, and as such only those nodes relevant to the data package 300 of FIG. 3 are shown in FIG. 4.

The data structure 400 represents the plurality of data packages previously transmitted over the data network 140 as a first subset of nodes 402 (hereinafter termed "package nodes"), with each package node corresponding to a particular data package which was previously transmitted over the data network 140. Each package node 402 is associated with one or more package properties, such as a transmission property indicating a time that the particular data package was transmitted over the data network 140.

The data structure 400 represents the plurality of groups or "cliques" associated with the data packages as a second subset of nodes 404 (hereinafter termed "group nodes"), with each group node corresponding to a particular group of users. The association of a particular data package with a particular group of users is defined by an edge (i.e. a link) between the corresponding package node and group node. In this respect, as each package node 402 corresponds to a single data package previously transmitted over the data network 140, each package node 402 is associated with a single group node 404 (i.e. a given data package node 402 cannot be associated with multiple group nodes 404). In contrast, a plurality of different data packages may be sent to a single unique group of user identifiers, so it is possible that a particular group node 404 may be associated with a corresponding plurality of package nodes 402.

The users corresponding to the senders and recipients of the data packages registered in the data structure 400 are represented by a third subset of nodes 406 (hereinafter termed "user nodes"). A given user may be associated with one or more groups, and this association is defined by one or more edges between the corresponding user node 406 and the respective one or more group nodes 406. Thus, the presence of an edge between a particular user node 406 and group node 404 indicates that that the corresponding user was a sender or a recipient of a data package exchanged amongst the corresponding group. Each user node 406 is associated with one or more user properties, including a user identifier which uniquely identifies the respective user for the user node 406.

Access events in respect of the data packages which have been registered in the data structure are represented by a fourth subset of nodes 408 (hereinafter termed "access nodes"). In this context, an access event may correspond to a recipient of a particular data package requesting or being provided with access to a payload associated with the particular data package. This access relationship between the data package and the recipient is provided by a first edge linking the corresponding access node 408 and respective user node 406, and a second edge linking the corresponding access node 408 and the respective package node 402. Each access node 408 is associated with one or more access properties, such as access data indicating the time that the access event occurred.

In the particular example shown in FIG. 4, the data structure 400 comprises three package nodes P1, P2 and P3, which are associated with two group nodes G1 and G2. Package nodes P1 and P2 are connected to group node G1 by respective edges $E_{P1\text{-}G1}$ and $E_{P2\text{-}G1}$, indicating that the corresponding data packages are associated with the unique set of users associated with group node G1. Similarly, package node P3 is connected to group node G2 by edge $E_{P3\text{-}G2}$, indicating that the corresponding data package is associated with the unique set of users associated with group node G2.

The data structure 400 further comprises six user nodes U1, U2, U3, U4, U5 and U6, which are associated with groups G1 and G2. Specifically, user node U1 is associated with groups G1 and G2 by virtue of edges $E_{U1\text{-}G1}$ and $E_{U1\text{-}G2}$ respectively; user node U2 is associated with group G1 by virtue of edge $E_{U2\text{-}G1}$; user node U3 is associated with group G1 by virtue of edge $E_{U3\_G1}$; user node U4 is associated with group G1 by virtue of edge $E_{U4\text{-}G1}$; user node U5 is associated with group G2 by virtue of edge $E_{U5\text{-}G2}$; and user node U6 is associated with group G2 by virtue of edge $E_{U6\text{-}G2}$.

The data structure 400 further comprises two access nodes A1 and A2, which correspond to access events in respect of data package P3. Specifically, access node A1 represents a first access event corresponding to user U6 accessing data package P3, as indicated by edges $E_{U6\text{-}A1}$ and $E_{A1\text{-}P3}$; and access node A2 represents a second access event corresponding to user U6 accessing data package P3, as indicated by edges $E_{U6\text{-}A2}$ and $E_{A2\text{-}P3}$. In other words, access nodes A1 and A2 represent separate access events, both of which involve user U6 and the payload of data package P3.

Referring back to FIG. 3, the data package 300 proposed for transmission over the data network 140 comprises metadata 310 indicating that a user U1 is the proposed sender of the data package 300 and that users U3, U4 and U5 are the proposed recipients of the data package 300. With reference to the data structure 400 shown schematically in FIG. 4, it can be seen that the proposed recipients U3, U4 and U5 of the data package 300 do not exactly correspond to either of the groups G1 and G2.

Figure 5:
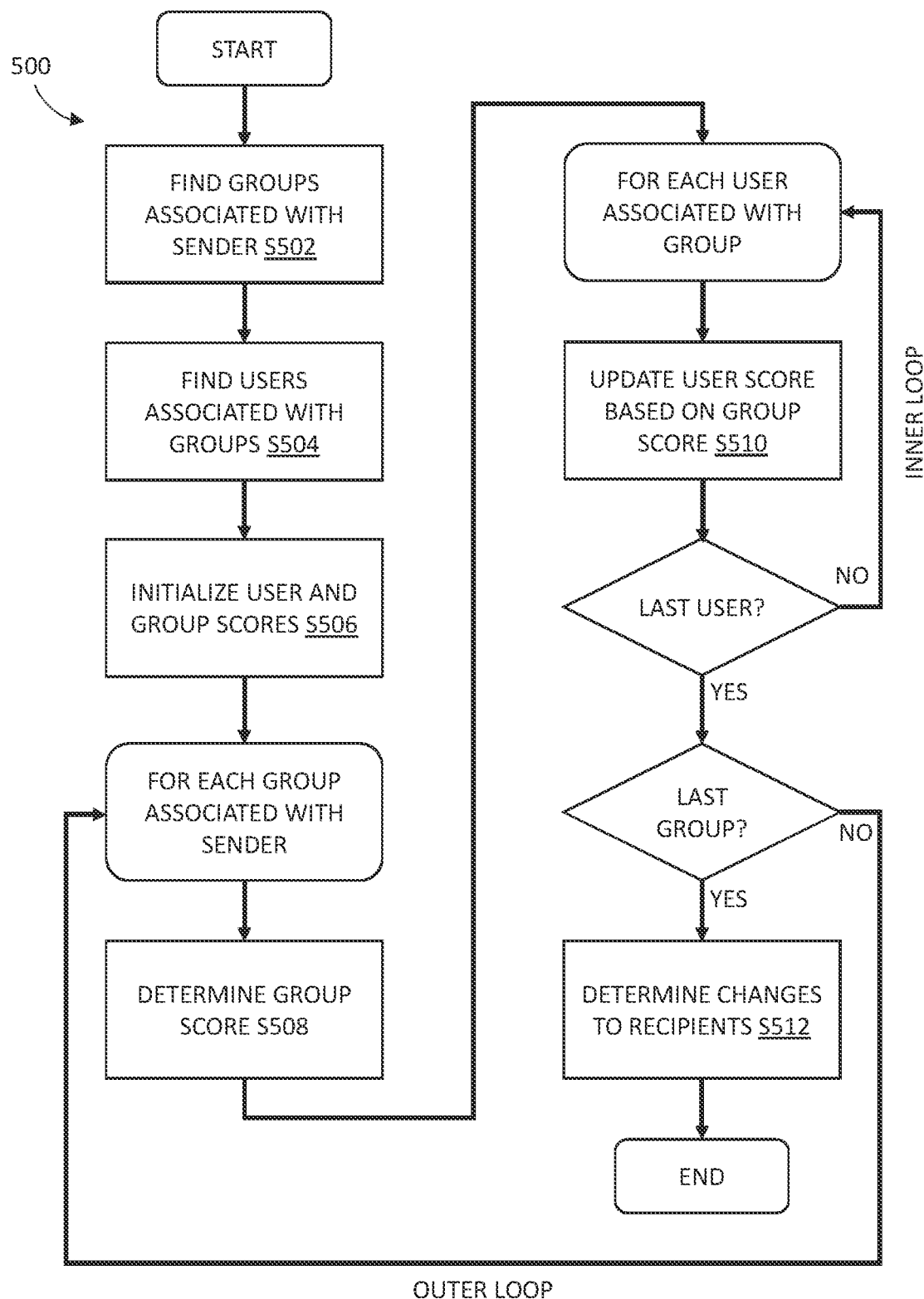
FIG. 5 is a flow diagram showing a method of determining one or more updates in accordance with an embodiment.

As discussed above with reference to FIG. 3, the update service 122 is configured to determine one or more updates to the group of proposed recipients based on the historical package data 132 (i.e. step S208 of FIG. 2). FIG. 5 is a flow diagram showing a method performed by the update service 122 to determine such update, which will now be explained with reference to the example data package 300 of FIG. 3 and the example data structure 400 of FIG. 4.

In a first step, the update service 122 accesses the data structure 400 and identifies one or more groups associated with the sender identifier designated for the data package 300 (step S502). With reference to FIGS. 3 and 4, in this step the update service 122 would determine that the sender identifier U1 is associated with groups G1 and G2 by virtue of edges $E_{U1\text{-}G1}$ and $E_{U1\text{-}G2}$ respectively.

After the determination performed in step S502, the update service 122 proceeds to identify all user identifiers associated with the identified groups (step S504). With reference to FIGS. 3 and 4, in this step the update service 122 would identify users U1, U2, U3, U4, U5 and U6 as user identifiers associated with the identified groups G1 and G2. In other words, the update service 122 identifies that U1, U2, U3, U4, U5 and U6 are user identifiers which correspond to the senders or recipients of one or more packages which were sent or received by the user associated with sender identifier U1 for the proposed data package 300.

Next, the update service 122 initialises a score for each of the identified groups (hereinafter termed a "group score") and each the identified user identifiers (hereinafter termed a "user score") determined in steps S502 and S504 (step S506). With reference to FIGS. 3 and 4, in this step the update service 122 would initialise a group score for each of the groups G1 and G2, and a user score for each of the user identifiers U1, U2, U3, U4, U5 and U6. Typically, the group scores and user scores are initialised to zero but it will be appreciated that other initial values are also possible.

After the group scores and user scores have been initialised in step S506, the update service 122 proceeds to calculate a group score for each of the groups identified in step S502 (step S508) and to calculate a user score for each of the user identifiers identified in step S504 based on the calculated group scores (step S510). Specifically, the group score for a particular group is calculated on the basis of a score for each of the packages associated with the particular group (hereinafter termed a "package score"), and the user score for a particular user identifier is calculated on the basis of the group scores for each of the groups associated with particular user identifier. In the embodiment shown in FIG. 5, steps S508 and S510 are performed in a nested manner, based on an outer loop which is performed for each of the groups identified in step S502, and an inner loop which is performed for each of the user identifiers associated with the current group being processed in the outer loop. Thus, where a user identifier is associated with multiple groups identified in step S502, the corresponding user score will be calculated on the basis of the group scores calculated for each of the multiple groups. With reference to FIGS. 3 and 4, the update service 122 would calculate a group score for group G1 based on package scores for packages P1 and P2, and update the user scores for each of user identifiers U1, U2, U3 and U4 based on the group score for group G1. Following this, the update service 122 would calculate a group score for group G2 based on a package score for package P3, and update the user scores for each of users U1, U5 and U6. Further details of the group score and user score calculations are described below with reference to FIGS. 6 and 7.

Once the user scores have been determined for all of the users identified in step S504, the update service 122 determines one or more changes to the group of recipient identifiers, based on the determined user scores and one or more conditions (step S512). In a first example, the update service 122 may determine that a particular user identifier should be added to the group of recipient identifiers when the associated user score exceeds a first threshold and the user identifier is not presently included in the group of sender identifiers. In a second example, the update service 122 may determine that a particular user identifier should be removed from the group of recipient identifiers when the associated user score does not reach a second threshold and the user identifier is presently included in the group of recipient identifiers. In a further example, the update service 122 may determine that a first user identifier should be added to the group of recipient identifiers, and that a second user identifier should be removed from the group of recipient identifiers.

According to some embodiments, the first and second thresholds applied in step S512 may be set using one or more rules based on the relative difference between the determined user scores. For example, with reference to the proposed data package 300 shown in FIG. 3, if the determined user scores for proposed recipients U3, U4 and U5 are the same within a predefined tolerance, then these proposed recipients would not be highlighted at possible wrong recipients. In contrast, if proposed recipients U3 and U4 are determined to have positive user scores and proposed recipient U5 is determined as having a user score of zero, then proposed recipient U5 would be highlighted as a possible wrong recipient. In a similar manner, if the user score for user U2 is determined as being an order or magnitude higher than the user score for user U6 (i.e. users not included in the proposed recipients for the data package 300), then user U2 would be proposed as a suggested recipient. Similarly, if users U2 and U6 are determined as having the same user score within a predefined tolerance, then neither user would be proposed as a suggested recipient. These example rules may be summarised according to the following pseudo-code:

```
find users to be added to group of proposed recipients
    if only single user:
        return nothing
    if difference in user scores is low:
        return nothing
    if absolute difference between highest user score and
    second highest user score is more than X percent of second
    highest user score:
            return user associated with highest user score
        otherwise return nothing
find users to be removed from group of proposed recipients
    if only single user:
        return nothing
    if difference in user scores is low:
        return nothing
    if score of lowest user score is zero:
        return user associated with zero score
    if absolute difference between lowest user score and
    second lowest user score is more than X percent of second
    lowest user score:
            return user associated with lowest user score
        otherwise return nothing
```

In the above pseudo-code, the parameter X is tuneable and may be selected on a trial and error basis. In some examples, a value of 5 percent may suitable for parameter X.

It should be noted that calculation of the user scores as described above with reference to FIGS. 4 and 5 includes calculation of a user score for the sender identifier U1. Thus, in some embodiments the sender identifier U1 may be removed from group of sender identifiers determined according to the method 500 of FIG. 5. For example, the method 500 of FIG. 5 may suppress any changes to the recipients relating to the sender identifier U1 in step S512.

Figure 6:
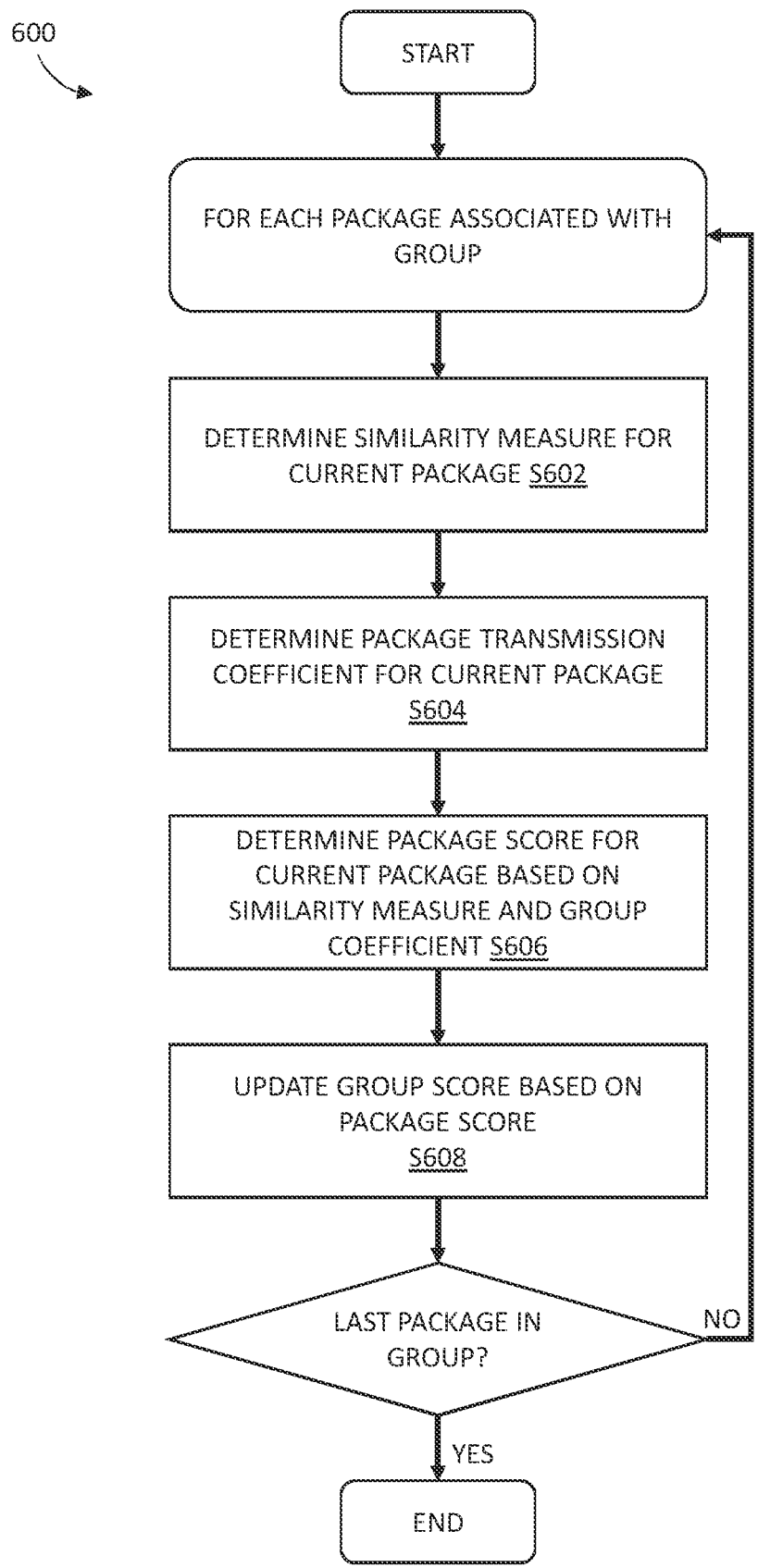
FIG. 6 is a flow diagram showing a method of determining a group score in accordance with an embodiment.

FIG. 6 is a flow chart showing a method 600 of determining the group score for a particular group in step S508 of method 500, in accordance with an embodiment. In particular, according to this method 600, the group score for the particular group is determined by recursively accumulating the package scores for one or more packages associated with the particular group. In this respect, the update service 122 first determines a similarity measure which is indicative of a degree of overlap or "similarity" between the group of recipient identifiers associated with the proposed recipients of the data package and the user identifiers associated with users in the particular group (step S602). Thus, in the case of group G1 in the example data structure 400, the update service 122 would determine a similarity measure indicative of the degree of overlap between the sender identifiers U3, U4 and U5, and the user identifiers U2, U3 and U4 associated with group G1.

Next, the update service 122 determines a package score for each package associated with the particular group. Specifically, for a particular package associated with the group, the update service 122 determines a package transmission (step S606) and multiplies the similarity measure by the package transmission coefficient to produce the package score for the particular package (step 608). Once the package score has been calculated for the particular package, it is added to the current group score for the particular group (step S610) and the procedure is repeated for any remaining packages associated with the particular group. In the case of group G1 in example data structure 400, the update service 122 would determine a package score for each of packages P1 and P2, and the group score for group G1 would correspond to the sum of these package scores.

According to some examples, the similarity measure $M_k$ determined in step S602 for a given package k may be calculated based on the Jaccard similarity coefficient $J_k$ for the package. Thus, where r is the group of proposed recipient identifiers and $u_k$ is the group of user identifiers associated with the current package k, the similarity measure may be expressed as follows:

$$M_k = J_k = \left|\frac{r \cap u_k}{r \cup u_k}\right|$$

In this respect, the Jaccard similarity coefficient $J_k$ provides a measure of the similarity of the group of proposed recipient identifiers and the group of user identifiers for the group associated with the package (i.e. $r \cap u_k$) relative to the diversity of the group of proposed recipient identifiers and the group of user identifiers for the group (i.e. $r \cup u_k$).

According to some examples, the similarity measure $M_k$ may further comprise a package-specific weight, based on the transmission time of the previously transmitted data package j and an approximation of the transmission time of the proposed data package (e.g. the current time). For example, the similarity measure may be calculated as $$M_k = \mu_1 J_k + \mu_2 K_k + \mu_3 L_k$$

where $K_k$ is a binary "time of the day" weighting which takes a value of 0 or 1, $L_k$ is a binary "day of the week" weighting which takes a value of 0 or 1, and $\mu_1$, $\mu_2$ and $\mu_3$ are tuneable coefficients. For example, the time of day weighting $K_k$ may take a value of 1 if the difference between the approximated transmission time of the proposed data package and the actual transmission time of the current data package k is less than a predetermined threshold (e.g. 4 hours), and a value of 0 for all other cases. Similarly, the day of the week weighting $L_k$ may take a value of 1 if the current data package k and the current day are the same or are included in the same group of days (e.g. weekdays or weekends), and a value of 0 for all other cases. In this manner, groups which are associated with packages sent at a similar time of day and/or a similar day of the week to the current time are considered as being "more similar" to the proposed data package and as such the users associated with those groups are given greater weight. In some examples, the coefficients $\mu_1$, $\mu_2$ and $\mu_3$ may take values of 0.90, 0.05 and 0.05 respectively. The values of the coefficients do not necessarily have to add up to one, for example in other embodiments $\mu_2$ and $\mu_3$ may be given values which are proportional to $\mu_1$, for example 1/18th the value of $\mu_1$.

According to some examples, the package transmission coefficient is formulated to provide greater weight (i.e. importance) to groups associated with one or more packages which were recently transmitted over the data network 140. In this respect, the group coefficient is a numerical value assigned to a package that is indicative of a relevance of the package to the group. A package which is of more relevance to the group, for example because it was sent more recently, may be determined to have a higher group coefficient than a less relevant package, for example one sent less recently. In such examples, the package transmission coefficient may be calculated using a decay function (hereinafter termed a "transmission decay function") which is a function of the time at which the corresponding package was sent. In one example, the package transmission coefficient $C_{j,k}^g$ for a group j in respect of a particular package k associated with the group is calculated according to the following transmission decay function:

$$C_{j,k}^g = 1 + \tanh\left(\frac{-\Delta D_k^t + \alpha_1}{\beta_1}\right)$$

According to this function $\Delta D_k^t$ is the number of days since transmission of the particular package k, and $\alpha_1$ and $\beta_1$ are tuneable parameters. In some examples, parameter $\alpha_1$ may take a value in the range 10 to 100 and parameter $\beta_1$ may take a value in the range 100 to 200. Combining the similarity measure $J_j$ and the package transmission coefficient of $C_{j,k}^g$ as defined above, the group score $S_j^g$ for group j can be expressed as follows:

$$S_j^g = \sum C_{j,k}^g \times M_k$$

wherein the sum is performed over all packages k associated with group j in the historic package data.

Figure 7:
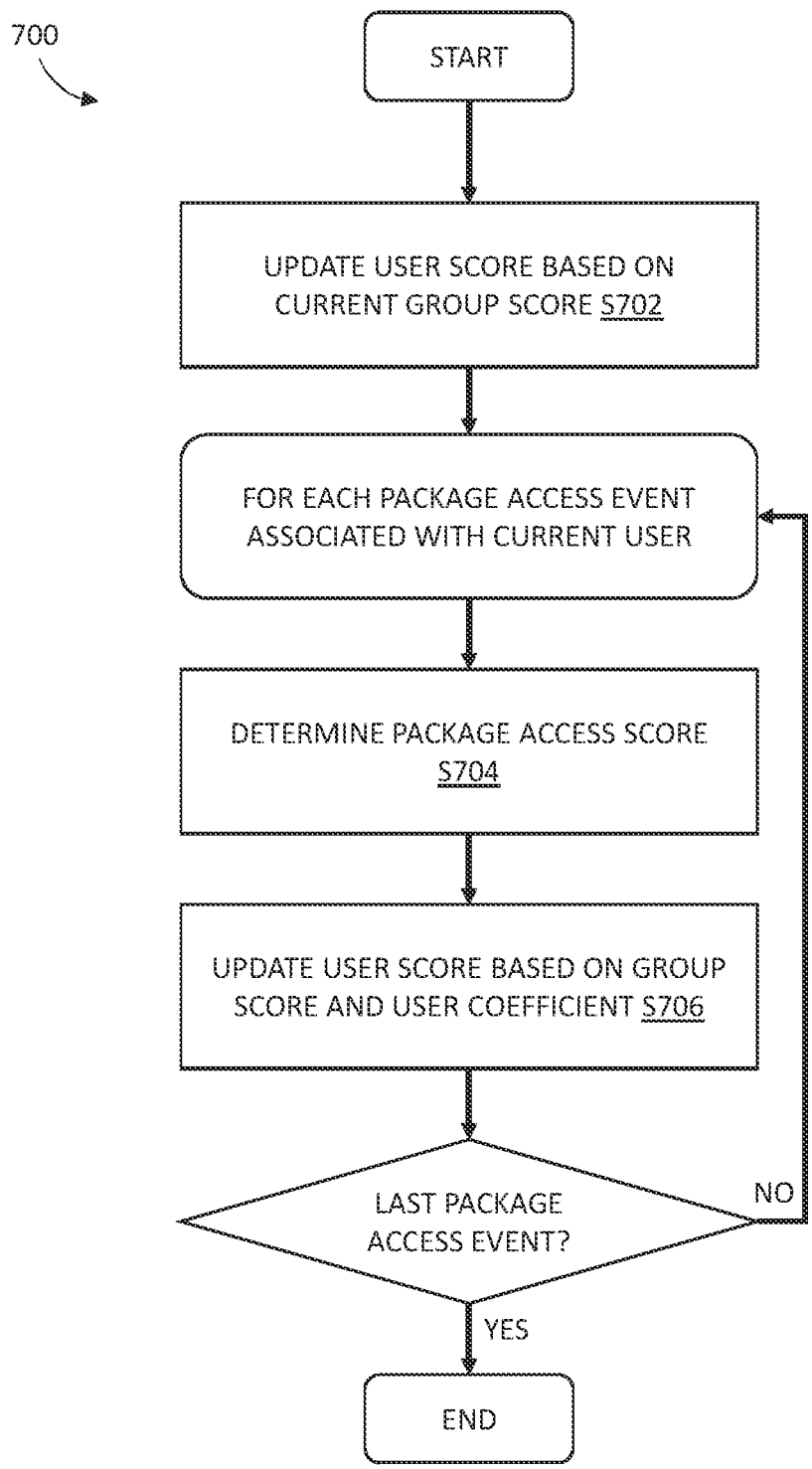
FIG. 7 is a flow diagram showing a method of determining a user score in accordance with an embodiment.

FIG. 7 is a flow chart showing a method 700 of updating the user scores in step S510 of method 500, in accordance with an embodiment. In particular, according to this method 700, the user score for a particular user identifier is determined by recursively accumulating a package access score for each package associated with the current group and adding this sum to the group score for the current group. In this respect, the update service 122 first updates the user score of the current user by adding the group score for the current group (step S702). Next, the update service 122 determines the package access score for the current user based on the current package (step S704) and then proceeds to update the user score based on the package access score (step S706). Thus, in the case of example data structure 400, the user score for user identifier U2 would be calculated as the group score for group G1 (i.e. no package access events); the user score for user identifier U3 would be calculated as the group score for group G1 (i.e. no package access events); the user score for user identifier U4 would be calculated as the group score for group G1 (i.e. no package access events); the user score for user identifier U5 would be calculated as the group score for group G2 (i.e. no package access events); and the user score for user identifier U6 would be calculated as the group score for group G2 added to the sum of the package access scores for user U5 in respect of packages P3 (i.e. package access events A1 and A2).

According to some embodiments, the package access score is formulated to provide greater weight (i.e. importance) to users which have more recently accessed the payload of the corresponding data package (i.e. interacted with the clique in question). Thus, the package access score is calculated as a decay function (hereinafter termed an "access decay function") which is a function of the time at which the user associated with the user identifier last accessed the corresponding package. In one example, the package access score $C_{i,k}^u$ for user i in respect of package k may be calculated according to the following access decay function:

$$C_{i,k}^u = \Theta\left[1 + \tanh\left(\frac{-\Delta D_{i,k}^a + \alpha_2}{\beta_2}\right)\right]$$

According to this function $\Delta D_{i,k}^a$ is the number of days since user i accessed the payload associated with package k, and $\Theta$, $\alpha_2$ and $\beta_2$ are tuneable parameters. In some examples, parameter $\alpha_2$ may take a value in the range 10 to 100 and parameter $\beta_2$ may take a value in the range 100 to 200 and parameter $\Theta$ may take a value in the range 0.05 to 1. Thus, by combining the group score $S_j^g$ defined above with the package access score $C_{i,k}^u$, the user score $S_i^u$ for user i can be expressed as follows:

$$S_i^u = \Sigma(S_j^g + \Sigma C_{j,k}^u)$$

wherein the outer sum is performed over all groups j associated with user i, and the inner sum is performed over all packages k associated with for the current group j of the outer summation.

When the methods 500, 600 and 700 are considered together, the general procedure for determining the user score for each user can be summarised according to the following pseudo-code:

```
for each group G associated with sender
    for each package P received by G
        group_score(G) += similarity(P) X pack_trans_coef(P)
    for each user U in group G
        user_score(U) += group_score(G)
        for each package P accessed by user U
            user_score(U) += package_access_score(P)
```

From this code, it can be seen that the user score for particular user is accumulated on a per-package and per-group basis. In other words, the user score for a particular user is based, in part, on every package which has been exchanged among each group of users comprising both the particular user and the sender of the proposed data package.

It will be appreciated that at least parts of the methods discussed above with reference to FIGS. 1 to 7 may be implemented using software instructions stored on a computer useable storage medium for execution by a computing device. As an example, an embodiment of a computer program product includes a computer useable storage medium to store a computer readable program that, when executed on a computing device, causes the computing device to perform operations, as described hereinbefore. Furthermore, embodiments of the invention can be embodied in the form of a computer program product accessible from a computer-usable or computer-readable medium providing program code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Figure 8:
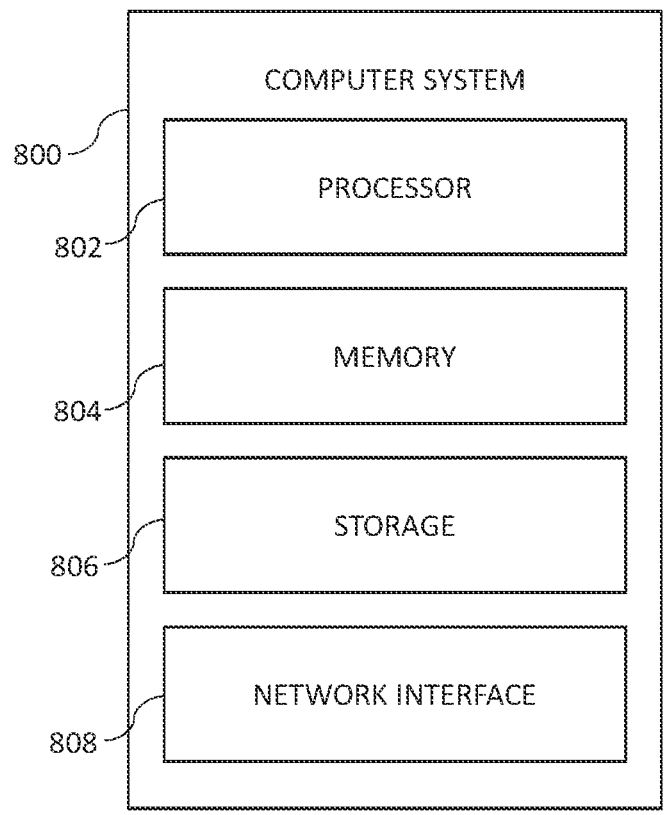
FIG. 8 is a schematic diagram showing a server system in accordance with an embodiment.

The client system 110 and server system 120 described above with reference to FIGS. 1 to 7 are typically embodied as a computer system that executes computer readable instructions. FIG. 8 depicts schematically an example of a suitable computer 800 that includes a processor 802, a memory 804, a storage device 806 and a network interface 808. The processor 802 may include a multifunction processor and/or an application-specific processor, examples of which include the PowerPC™ family of processors by IBM™ and the x86 and x86-64 family of processors by Intel™. The memory 804 within the computer is typically RAM and storage device 806 is typically a large capacity permanent storage device such as a magnetic hard disk drive or solid state memory device. The network interface 808 enables communications with other computers in a network using as suitable protocol, such as the Internet Protocol (IP) and the processor 802 executes computer readable instructions stored in storage 806 to implement embodiments of the invention as described hereinbefore.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling transmission of data over a data network, the method comprising:
   authenticating a first user of a client system with a server system;
   sending to the server system, a request message comprising data corresponding to a first group of user identifiers corresponding to a plurality of proposed recipients;
   determining one or more updates to the group of user identifiers based at least in part on:
      a group score based on a similarity measure indicative of a degree of overlap between the first group of user identifiers and a second group of user identifiers associated with an historical data package, the second group of user identifiers comprising a user identifier corresponding to the first user; and
      a user score for a second user identifier in the second group based on the group score and access data indicative of a time at which the second user accessed a payload associated with the historical data package;
   transmitting a control message to the client system, the control message comprising data indicative of the one or more updates to the group of user identifiers;
   generating an updated group of user identifiers based on the data of the control message;
   constructing a data package comprising a set of recipients based on the updated group of user identifiers; and
   transmitting the data package to the set of recipients.

2. The method of controlling transmission of data according to claim 1, wherein the one or more updates indicate that the second user identifier should be removed from the first group of user identifiers when the user score satisfies a removal condition and the first group of user identifiers includes the second user identifier.

3. The method of controlling transmission of data according to claim 1, wherein the one or more updates indicate that the second user identifier should be added to the first group of user identifiers when the user score satisfies an addition condition and the first group of user identifiers does not include the second user identifier.

4. The method of controlling transmission of data according to claim 1, wherein the historical data package is associated with a graph data structure which defines a relationship between the second group of user identifiers, the historical data package, the access data, and transmission data associated with a time at which the second historical data package was transmitted.

5. The method of controlling transmission of data according to claim 1, wherein the second group of user identifiers is associated with a second historical data package, the method further comprising updating the group score for the second group of user identifiers based on the similarity measure and transmission data indicating a time at which the second historical data package was transmitted.

6. The method of controlling transmission of data according to claim 5, further comprising updating the user score for the second user identifier in the second group of user identifiers based on access data indicating a time at which the second user accessed the second historical data package.

7. The method of controlling transmission of data according to claim 1, wherein the similarity measure is calculated according to:

$$J = \left| \frac{r \cap u}{r \cup u} \right|$$

wherein r is the first group user identifiers and u is the second group of user identifiers.

8. The method of controlling transmission of data according to claim 1, wherein the group score for the second group of user identifiers is updated based on a transmission decay function which is a function of the time that has elapsed since the time at which the historical data package was transmitted.

9. The method of controlling transmission of data according to claim 8, wherein the transmission decay function is calculated according to:

$$1 + \tanh\left( \frac{-\Delta D^t + \alpha_1}{\beta_1} \right)$$

wherein $\Delta D^t$ is the number of days since the time at which the second data package was transmitted and $\alpha_1$ and $\beta_1$ are tuneable parameters.

10. The method of controlling transmission of data according to claim 1, wherein the user score for the second user identifier in the second group of user identifiers is updated based on an access decay function which is a function of the time that has elapsed since the time at which the second user accessed the payload associated with the historical data package.

11. The method of controlling transmission of data according to claim 10, wherein the access decay function is calculated according to:

$$\Theta\left[ 1 + \tanh\left( \frac{-\Delta D^a + \alpha_2}{\beta_2} \right) \right]$$

wherein $\Delta D^a$ is the number of days since the time at which the second user accessed the payload associated with the historical data package and $\Theta$, $\alpha_2$, and $\beta_2$, are tuneable parameters.

12. The method of controlling transmission of data according to claim 1, wherein the historical data package is an email message and the payload associated with the historical data package is content contained in a body of the email message.

13. The method of controlling transmission of data according to claim 1, wherein the payload associated with the historical data package is an encrypted payload and the time indicated by the time at which the second user accessed the payload associated with the second data package corresponds to the time of receipt of a request from the second user to access the encrypted payload.

14. A non-transitory computer-readable storage medium comprising computer-executable instructions which, when executed by a processor, cause a computing device to perform a method of controlling transmission of data according to claim 1.

15. A system for controlling transmission of data, the system comprising one or more processors; and a memory configured to store computer-executable instructions which, when executed by the one or more processors, cause the system to perform a method of controlling transmission of data according to claim 1.

* * * * *